Figure 1:
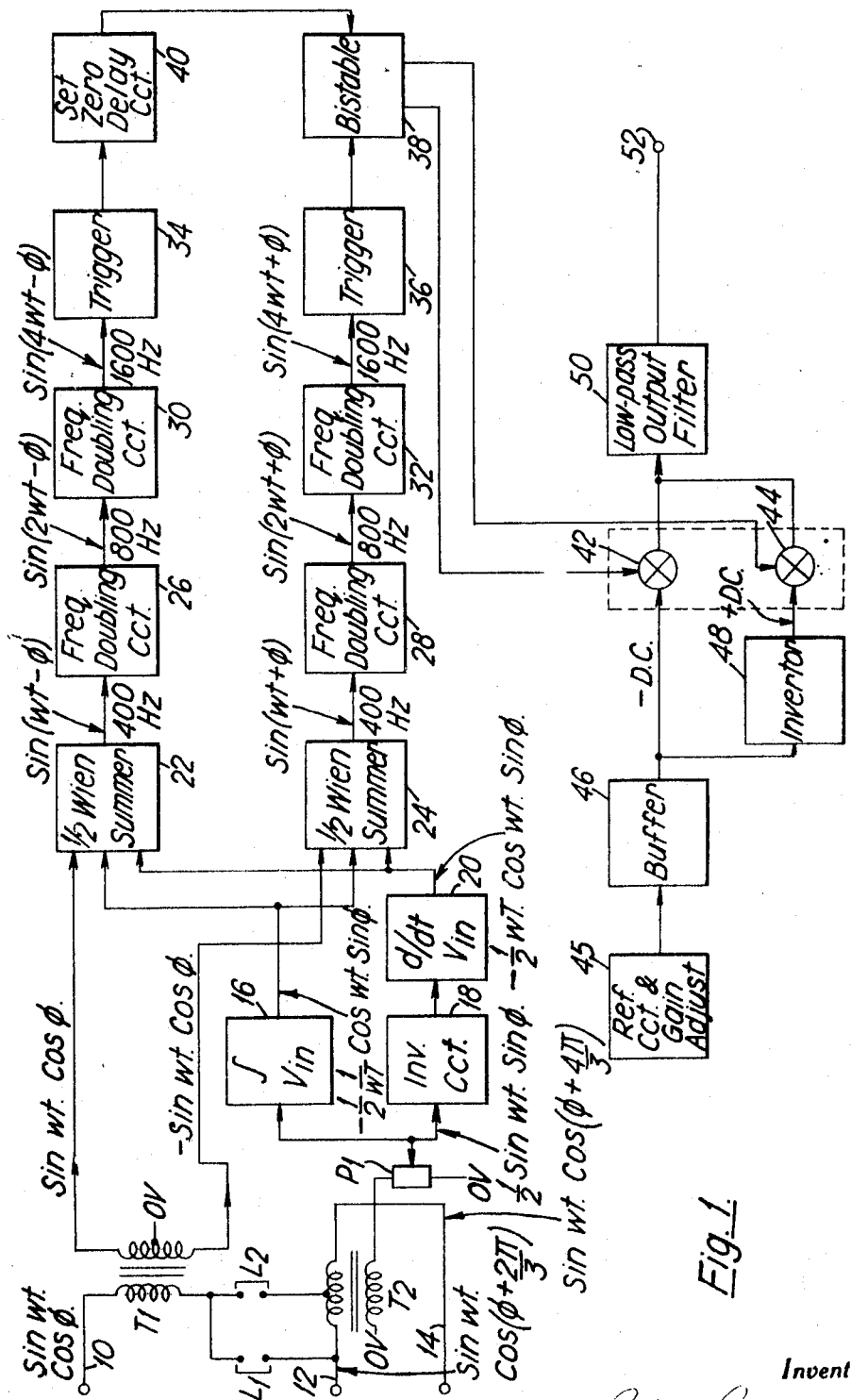

United States Patent
Perrett

[15] 3,648,042
[45] Mar. 7, 1972

[54] APPARATUS FOR SIGNALLING ANGULAR DISPLACEMENT

[72] Inventor: Brian Raymond Perrett, Radstock, England

[73] Assignee: British Aircraft Corporation Limited, London, England

[22] Filed: Mar. 31, 1970

[21] Appl. No.: 24,147

[30] Foreign Application Priority Data

Apr. 16, 1969 Great Britain..................19,435/69

[52] U.S. Cl..........................235/189, 235/183, 235/186, 318/661
[51] Int. Cl. ......................................................G06g 7/22
[58] Field of Search..................735/183, 186, 189; 307/232, 307/295; 328/133, 134, 155; 318/654, 661; 340/198, 347

[56] References Cited

UNITED STATES PATENTS

| 3,537,018 | 10/1970 | Modiano | 328/133 |
| 3,504,361 | 3/1970 | Catton | 235/186 X |
| 3,482,231 | 12/1969 | Florek et al. | 340/198 |
| 3,555,542 | 1/1971 | Guiot | 340/198 X |
| 3,521,173 | 7/1970 | Farley | 307/232 X |
| 3,509,475 | 4/1970 | Parker | 328/133 |
| 3,469,196 | 9/1969 | Cowin et al. | 328/133 |
| 3,465,256 | 9/1969 | Moses | 328/133 |
| 3,464,016 | 8/1969 | Kerwin et al. | 328/133 X |

Primary Examiner—Felix D. Gruber
Attorney—Kemon, Palmer & Estabrook

[57] ABSTRACT

To signal the angle displacement of the synchro transmitter or resolver rotor, signals representing products of trigonometrical functions of the supply voltage angle $\omega t$ and the rotor angle $\phi$ are processed until they can be combined to give a resultant sin $(\omega t \pm \phi)$ or cos $(\omega t \pm \phi)$ and the resultant is then compared with sin $\omega t$ or cos $\omega t$ to obtain the rotor angle $\phi$. Parallel integrator and differentiator circuits in the processing unit prevent substantial amplitude change with frequency drift. Frequency doubling circuits are used in such a manner that flyback occurs at a selected submultiple of 180°.

8 Claims, 5 Drawing Figures

Patented March 7, 1972 3,648,042

4 Sheets-Sheet 4

Inventor
Brian Raymond Perrett
By
Kemon, Palmer & Estabrook
Attorneys 3,648,042

APPARATUS FOR SIGNALLING ANGULAR DISPLACEMENT

This invention relates to apparatus for signalling the angular displacement of a body about an axis using a synchro transmitter or resolver, the output from which is resolved by electronic means to derive an electric signal representative of the said angular displacement.

According to the present invention, we derive from the synchro transmitter or resolver first and second signals representing two different products of two terms, one of which is a sine or cosine function of the supply angle and the other of which is the sine or cosine function of the rotor angle, one of the terms occurring in both products; we then derive from a first of these signals a further signal which is the equivalent of the second signal with the sine and cosine functions reversed; thereafter we combine the said further signal with the second signal to obtain a resultant signal representing the sine or cosine of the sum or difference of the supply angle and the rotor angle, and we compare this resultant signal with the corresponding sine or cosine of the supply angle to obtain a signal representing the rotor angle.

The signal indicating the rotor angle will have a flyback every 180°. If it is required that the flyback occurs every 90°, for example, the said resultant signal may be applied to a frequency doubling circuit. For example, if the said resultant signal represents the sine of the sum of the supply angle and the rotor angle, the output of the frequency doubling circuit will represent the sine of the rotor angle and twice the supply signal angle.

In our preferred apparatus embodying the invention, we provide a zero-setting means including means generating a pulse for every cycle of the supply signal and responsive to the said resultant signal to control the pulse phase in accordance with the rotor angle; a capacitor connected to a constant current charging circuit is discharged in synchronism with the pulses and the capacitor waveform is compared with a reference level by a comparator which generates pulses having a mark-space ratio controlled by this comparison. The reference level, the adjustment of which provides the zero-setting facility, is preferably derived from the peak value of the charging capacitor voltage so that slow changes in the charging circuit will equally affect the reference level and the charging waveform.

As an example, the first and second signals may be $\sin \omega t \sin \phi$ and $\sin \omega t \cos \phi$ (the term $\sin \omega t$ occurring in both products); from the first product signal we derive a further signal $\cos \omega t \sin \phi$, which is the equivalent of the second product signal with the sine and cosine functions reversed. We then combine the second signal and the further signal to obtain $\sin (\omega t + \phi)$.

It is an important feature of the preferred apparatus, that one of the said product signals, in which a sine or cosine component has to be converted to a cosine or sine component, is applied both to an integrator circuit and, through an inverter circuit, to a differentiator circuit, the outputs of the integrator and differentiator being added. Electronic circuits that will produce a 90° phase shift normally cause an output amplitude change if the frequency varies. This is a serious disadvantage, particularly for an aircraft 400 Hz. supply which may drift by as much as 10 percent. If our parallel integrator and differentiator circuits have similar time constants, the effects of a frequency variation on the two circuits are in opposite senses and the resultant change in amplitude is very small.

In order that the invention may be better understood, one example will now be described with reference to the accompanying drawings. In this example, we used the trigonometrical combination formulas $\sin A \cos B \pm \cos A \sin B = \sin (A \pm B)$. However, the circuit could equally well be designed to use only one of these alternatives or to use one or both of the relationships $\cos A \cos B \pm \sin A \sin B = \cos (A \pm B)$. In the drawings:

FIG. 1 is a block diagram of the apparatus, and
FIGS. 2 to 5 are circuit diagrams of component parts of FIG. 1.

The three stator windings of a synchro transmitter (not shown) provide on lines 10, 12 and 14 signals having the values $\sin \omega t \cos \phi$, $\sin \omega t \cos (\phi + 2\pi/3)$, $\sin \omega t \cos (\phi + 4\pi/3)$ applied across the primary windings of two transformers $T_1$ and $T_2$. As it has been assumed that a synchro transmitter provides the input signals, link $L_2$ is closed to provide a Scott connection between the two transformer primaries. If a resolver had provided the input signals link $L_2$ would have been open and link $L_1$ would have been closed.

In either case, the signals derived from the ends of the center-tapped secondary of transformer $T_1$ represent $V_1 \sin \omega t \cos \phi$ and $-V_1 \sin \omega t \cos \phi$ respectively. One end of the secondary of transformer $T_2$ is grounded and the other end supplies a potentiometer $P_1$, the wiper of which provides a signal representing $V_1/2 \sin \omega t \sin \phi$.

We require to convert this latter signal into $V_1/2 \cos \omega t \sin \phi$, that is to say $\sin \omega t$ has to be changed to $\sin (\omega t - 90°) = \cos \omega t$. However, as explained above conventional electronic circuits which can produce a 90° phase shift result in amplitude variation in face of frequency drift. An integrator circuit alone, operating on the signal $$V_1/2 \sin \omega t \sin \phi \text{ would give}$$

$$-V_1/2 \cdot 1/\omega T \cos \omega t \sin \phi$$

where T is the time constant of the integrator.

If the frequency $\omega$ increases by 10 percent, the amplitude of the integrator output falls by 10 percent. In a similar manner, the inverting and differentiating circuits alone, operating on the same input voltage would give $$-V_1/2 \cdot \omega T \cos \omega t \sin \phi$$

where again T is the time constant of the differentiator. In this case if the frequency increases by 10 percent, the amplitude increases by 10 percent.

By connecting the integrator in parallel with the inverting and differentiating circuits and combining their outputs in a subsequent summing stage, the effect of frequency drift on the amplitude is drastically reduced. If the time constant T is the same for the integrating and differentiating circuits, it can be shown that for $\omega = (\omega_0 \pm \Delta \omega_0)$, the amplitude of the summing circuit output will vary approximately by a factor of $$1 + \tfrac{1}{2}(\Delta \omega_0)^2/\omega_0$$

Thus, if $\Delta \omega_0 = 10\% \omega_0$, this 10 percent change in frequency results in a change in amplitude of only one-half percent.

Referring again to the drawing, the signal $V_1/2 \sin \omega t \sin \phi$ from the wiper of potentiometer $P_1$ is applied firstly to an integrator circuit 16 from which there is obtained an output $-1/\omega T \cos \omega t \sin \phi$; and secondly to an inverter circuit 18 followed by a differentiating circuit 20 from which there is obtained an output equal to $-\omega T \cos \omega t \sin \phi$.

The signals from the circuits 16 and 20 are both applied to each of two half-Wien summing circuits 22 and 24. The half-Wien summing networks are used instead of conventional resistive summing networks to eliminate the high frequency "noise" which differentiators tend to emphasize. In the circuit 22 these two signals are added to the $\sin \omega t \cos \phi$ signal from transformer $T_1$ and in circuit 24 they are added to the $-\sin \omega t \cos \phi$ signal from the lower end of the secondary of transformer $T_1$.

It has been shown that the signals from circuits 16 and 20, when added with suitable scaling factors, are equivalent to $-\cos \omega t \sin \phi$, therefore the output of the circuit 22 is the sum of $\sin \omega t \cos \phi$ and $-\cos \omega t \sin \phi$, namely $\sin (\omega t - \phi)$. In a similar way, the output of the summing circuit 24 is $\sin(\omega t + \phi)$. Thus, in each case a signal has been obtained which can be compared with the rotor input signal $\sin \omega t$ to provide an output representing the rotor angle $\phi$. The signals $\sin (\omega t - \phi)$ and $\sin(\omega t + \phi)$ could be used to control opposite inputs of a bistable circuit and thereby to control gates permitting the passage of positive or negative DC voltage, so that the output voltage would represent in amplitude and polarity the amplitude and sense of the angle $\phi$. This signal would increase progressively from 0° to 180° and then would then would fly back to the value it had at 0°.

In the present example, it was required to make the output flyback occur every 45°. To do this, the outputs of the two circuits 22 and 24 were applied to frequency doubling circuits 26 and 28 respectively. It will be appreciated that in the resultant expressions for the output signals, only the rotor input voltage phase angle is doubled, so that the outputs of circuits 26 and 28 are sin $(2\omega t-\phi)$ and sin $(2\omega t+\phi)$. In this example the input frequency was 400 Hz. and consequently the frequency of the signals from the doublers 26 and 28 is 800 Hz. In a similar manner, these signals are again doubled in frequency by the frequency doubling circuits 30 and 32 to give outputs at a frequency of 1,600 Hz. represented by the expressions sin$(4\omega t-\phi)$ and sin $(4\omega t+\phi)$ respectively.

The signals from the frequency doubling circuits 30 and 32 go to trigger circuits 34 and 36. These convert each signal into a train of pulses of substantially square waveform. The pulses from trigger circuit 36 go directly to one side of a bistable circuit 38. The pulses from trigger circuit 34 are applied first to a circuit 40 which provides a "set zero" facility which has the same effect as rotating the body of the synchro. The pulses from this set-zero circuit go to the other side of the bistable circuit 38. Opposite outputs of the bistable circuit control switches 42 and 44 which are field-effect transistor circuits. The switch 42 receives positive DC voltage from the reference and gain-adjusting circuit 45 by way of the buffer 46. The switch 44 receives the output of the buffer 46 through an inverter 48 and is thus supplied with negative DC voltage. The output of the switches 42 and 44 goes through a low-pass output filter 50 to the output terminal 52. As indicated above, the outputs of the circuits 30 and 32 are sine waveforms whose phase changes completely for 45° rotation of the synchro rotor. Consequently, the output voltage at terminal 52 has a flyback every 45° of rotation of the synchro rotor. The omission of the second frequency doubling circuit in each chain would give an output having a full cycle of variation in a submultiple of 360° variation of the angle $\theta$ or stated differently, a flyback every 90° of rotation.

Turning now to the details of the circuits, the integrating circuit 16 is of conventional design with a capacitor in the feedback loop around an amplifier. The inverter circuit 18 is a conventional inverting amplifier and the differentiating circuit 20 is again of conventional form with a series capacitor in the input lead and a resistive feedback connection connected back to the same input. Such circuits are well known and can be found in standard textbooks. The half-Wien summing circuits are also conventional. The three inputs to be added pass through individual capacitors to a common point to which is also connected the feedback resistor of the amplifier. A capacitor is connected across the feedback resistor.

Figure 2:
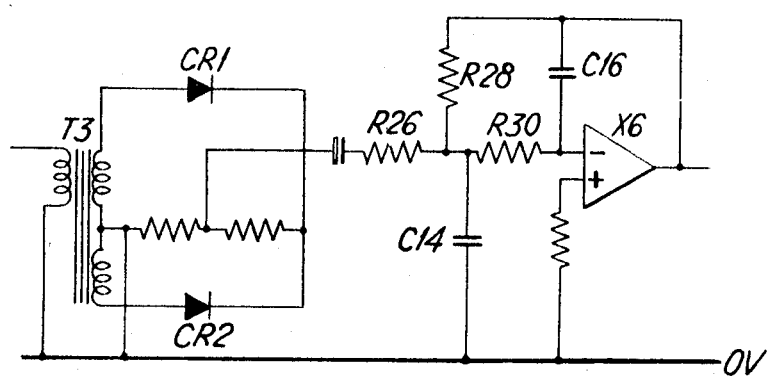

The voltage doubling circuit used in the blocks 26, 28, 30 and 32 of FIG. 1 is shown in greater detail in FIG. 2. The transformer $T_3$ and the diodes CR1 and CR2 provide full-wave rectification of the 400 c/s resolved signal and the full-wave rectified signal then passes through an 800 c./s. band-pass filter formed by the resistors R26, R28 and R30 and the capacitors C14 and C16. The values of the resistors R26, R28 and R30 depend upon the center frequency of the band-pass filter. The capacitor C16 is in the feedback circuit of an integrated-circuit differential amplifier X6 of the kind available under the designation Type 741.

Figure 3:
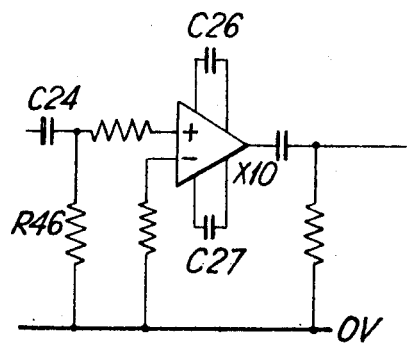

The trigger circuit or zero-crossing detector is shown in FIG. 3. This circuit includes an integrated-circuit differential amplifier X10 of the kind available under the designation Type 709. The capacitor C26 and C27 are stabilizing components which eliminate any tendency for the amplifiers to oscillate during the output voltage transitions. An amplifier of the kind indicated has an open-loop gain such that the output will change from full negative to full positive for a differential input voltage change of 1 or 2 millivolts. The capacitor C24 and the resistor R46 decouple any DC component from the preceding frequency doubling circuit and the voltage across R46 is therefore a sine wave symmetrical about 0V. The input impedance of differential amplifier X10 is very high and the voltage on the inverting input is 0V. Consequently the output of amplifier X10 is a square wave switching at the zero crossing points of the sine wave input. The transitions in the sine wave contain the phase information which is required.

Figure 4:
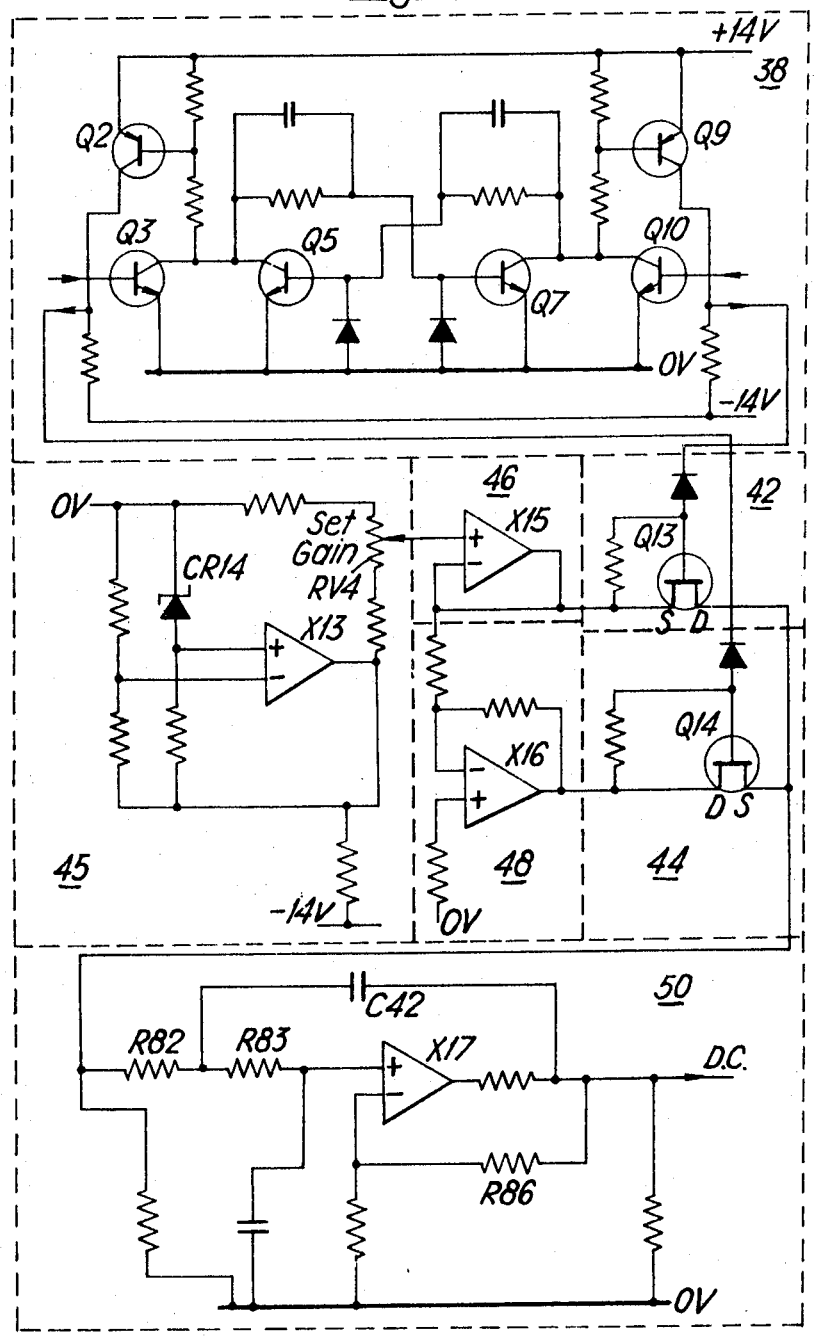
Figure 5:
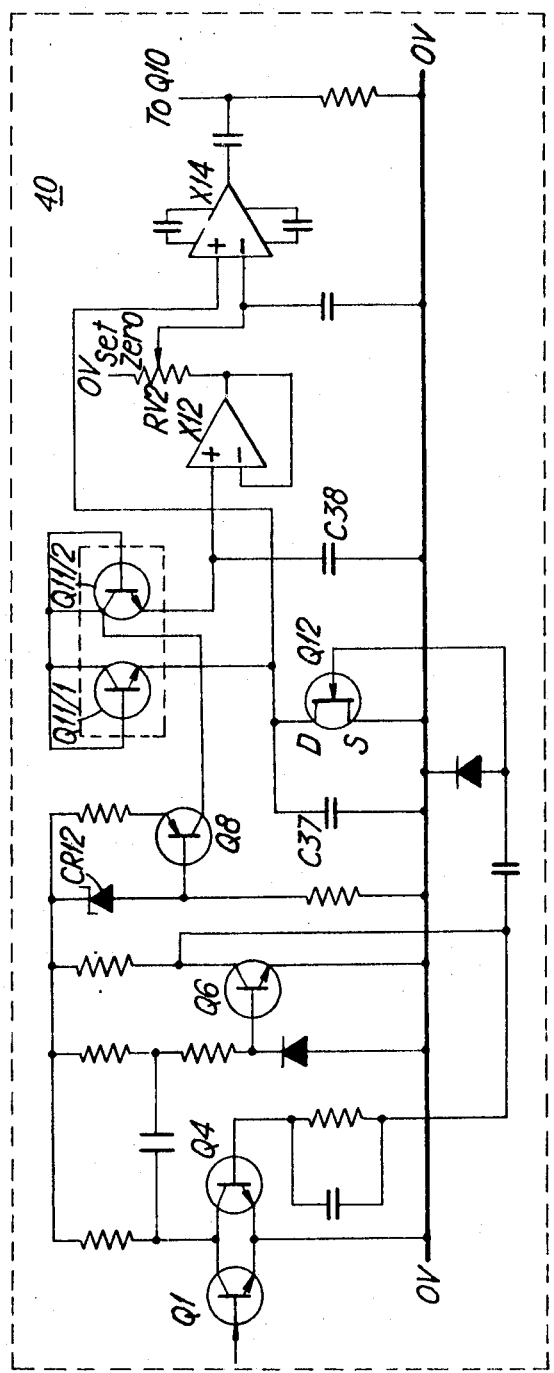

The bistable circuit 38 and the field-effect transistor switches are shown in FIG. 4. The bistable circuit 38 includes two cross-coupled transistors Q5 and Q7, two input transistors Q3 and Q10, and two output transistors Q2 and Q9. The transistor Q3 receives its input signal directly from the trigger circuit 36. The transistor Q10 receives its input signal from the trigger circuit 34 through the set-zero delay circuit 40, which will be described later. The output of this delay circuit is a square waveform identical to the output of trigger circuit 34 but with its phase delayed by an adjustable amount.

Thus, the output of the bistable circuit is a pulse train with a repetition frequency of 1,600 pulses per second and a mark-space ratio which depends upon the value of the angle $\phi$. The transistors Q2 and Q9 at the outputs of the bistable circuit trigger two field-effect transistors Q13 and Q14 alternately. The drain electrode of the transistor Q13 and the source electrode of the transistor Q14 are connected to one end of a common load resistor R82 and the transistors Q13 and Q14 provide the resistor 82 with an input waveform switching between precise +1 volt and −1 volt levels, the mark-to-space ratio of this waveform being determined by the rotor position. The voltages for the field-effect transistors are derived from differential amplifiers X13, X15 and X16. The amplifier X13 has a zener diode CR14 between its noninverting input and ground and the circuit forms a conventional zener reference circuit with an output potentiometer RV4 providing an adjustable negative output. The differential amplifier X15 is a buffer for this negative output and the differential amplifier X16 provides the direct positive equivalent of this output. In this way the positive and negative voltage reference lines for the field-effect transistor switches are set up. Amplifiers X15 and X16 are of the kind known as Type 741.

The resistor R82 at the output of the two field-effect transistor switches has its other end connected through resistor R83 to the noninverting input of a Type 741 differential amplifier X17. A feedback capacitor C42 is connected to the junction of the resistors R82 and R83 and a feedback resistor R86 extends to the inverting input of the amplifier. The components around the amplifier act to filter out the DC component of the waveform at the front end of resistor R82.

From the output of the low-pass output filter 50 there is obtained a DC voltage representing the angle $\phi$.

The set-zero delay circuit will now be described. The transistors Q1, Q4 and Q6 (FIG. 5) form a short-pulse generator which emits a pulse whenever the output of trigger circuit 34 switches positive. The pulse from transistor Q6 switches on the field-effect transistor Q12 for short periods to discharge capacitor C37. The voltage at the base of transistor Q8 is controlled by the zener diode CR12 and this transistor acts to provide a constant current for charging capacitor C37. This current reaches capacitor C37 by way of transistor Q11/1. The two transistors Q11/1 and Q11/2 are in one package and are used as very closely matched diodes, back to back.

The peak voltage, reached at the instant prior to the discharging of capacitor C37 through transistor Q12, is stored on capacitor C38, which it reaches by way of transistor Q11/2. The voltage stored on capacitor C38 is a function of the supply frequency and the charging current to capacitor C37. This peak voltage goes to the noninverting input of a Type 741 differential amplifier X12, the output of which is a DC voltage similar to that on capacitor C38. An adjustable fraction of this voltage is picked off at the wiper of potentiometer RV2, at the output of amplifier X12, and is fed to the inverting input of the Type 709 differential amplifier X14. The noninverting input of the amplifier X14 is connected to the capacitor C37 and receives the ramp voltage across the latter. Whenever the voltage across capacitor C37 reaches the value of the voltage at the wiper of potentiometer RV2, the output of amplifier X14 switches. The instant of switching can thus be adjusted and the adjustment effectively changes the mark-to-space ratio at the output of the bistable circuit in exactly the same way as would be produced by rotating the synchro body.

This delay system has certain advantages. Firstly, a slow change in the constant current output of transistor Q8 does not matter because the voltage derived from amplifier X12 and the ramp voltage across capacitor C37 are directly related. Provided that the ramp voltage is linear, its slope does not matter. Secondly, if the 400 c./s. input drifts slowly above or below the nominal frequency, the condition which causes amplifier X14 to switch is again such that the effective delay in terms of phase is unaltered.

Reverting to the frequency doubling facility, this is extremely useful when the total angle of interest is never more than a small fraction of 360° about a zero position. One example of this is where the angle of elevons in an aircraft system is being indicated. The frequency doubling method makes possible the magnification of the angular movement without the use of multipole synchros or of gear trains on single-pole-pair synchros or of amplification of the basic electronic resolver output. The latter would amplify the errors together with the output signal and, what is more important, gives magnified output ripple which is often unacceptable. The frequency doubling proposed in the present specification eases the ripple problem.

In the example shown, Scott-connected transformers are used. It would also be possible to use star-delta resistor meshes but this imposes a DC earth reference on the synchro output lines. In the example shown, when synchro resolver sources are used the transformers which are Scott-connected for the synchro transmitters serve instead as simple isolation transformers.

I claim:

1. Apparatus for signalling the angular displacement $\phi$ of the rotor of a synchro transmitter or resolver about an axis, comprising:
   means for deriving from the synchro transmitter or resolver first and second electric signals representing respectively $\sin \omega t \sin \phi$ and $\sin \omega t \cos \phi$, where $\omega t$ is the phase angle of the supply for the synchro transmitter or resolver;
   phase-shifting means for deriving from the signal representing $\sin \omega t \sin \phi$ a third signal representing $\cos \omega t \sin \phi$;
   means for adding and subtracting the said second and third signals to obtain fourth and fifth signals representing $\sin(\omega t + \Phi)$ and $\sin(\omega t + \phi)$; and
   means, including a comparator, responsive to the said fourth and fifth signals to derive an output signal varying with the angle $\phi$ and having a full cycle of variation in a submultiple of a 360° variation of the angle $\phi$.

2. Apparatus for signalling the angular displacement $\phi$ of the rotor of a synchro transmitter or resolver about an axis, comprising:
   means for deriving from the synchro transmitter or resolver first and second electric signals representing respectively $\sin \omega t \sin \phi$ and $\sin \omega t \cos \phi$, where $\omega t$ is the phase angle of the supply for the synchro transmitter or resolver;
   phase shifting means for deriving from the signal representing $\sin \omega t \sin \phi$ a third signal representing $\cos \omega t \sin \phi$;
   means for combining the said second and third signals to obtain a fourth signal representing the sine of the sum or difference of the angles $\omega t$ and $\phi$;
   frequency multiplying means connected to receive the fourth signal and to provide a frequency-multiplied signal representing the sine of the sum or difference of the angles $n\omega t$ and $\phi$, where $n$ is the ratio of the frequency multiplier; and
   means, including a comparator, responsive to the said frequency-multiplied signal and to a further signal representing a trigonometric function of an angle varying with the angle $\omega t$ to derive an output signal varying with the angle $\phi$ and have a full cycle of variation in a submultiple of a 360° variation of the angle $\phi$.

3. Apparatus in accordance with claim 2, in which the said signal-combining means provides a signal representing $\sin(t+\phi$ signal representing $\sin(n\,t\text{ZF})$, the apparatus including a further signal-combining means to provide a signal representing $\sin(t/\text{F})$ and further frequency-multiplying means to provide a signal representing $\sin(n\,\omega t/\text{F})$, the said comparator being connected to respond to the signals $\sin(n\omega t\text{ZF})$ and $\sin(n\omega t/\text{F})$.

4. Apparatus for signalling the angular displacement $\phi$ of the rotor of the synchro transmitter or resolver about an axis, comprising:
   means for deriving from the synchro transmitter or resolver first and second electric signals representing $\sin \omega t \sin \phi$ and $\sin \omega t \cos \phi$, where $\omega t$ is the phase angle of the supply for the synchro transmitter or resolver;
   phase-shifting means for deriving from the signal representing $\sin \omega t \sin \phi$ a third signal representing $\cos \omega t \sin \phi$;
   means for combining the said second and third signals to obtain a fourth signal representing the sine of the sum or difference of the angles $\omega t$ and $\phi$;
   further means, including a comparator, responsive to the said fourth signal and to a further signal representing a trigonometric function of an angle varying with the angle $\omega t$ to derive an output signal varying with the angle $\phi$ and having a full cycle of variation in a submultiple of a 360° variation of the angle $\phi$; and
   zero-setting means connected in the input circuit of the said comparator to receive the said fourth signal prior to its application to the comparator.

5. Apparatus in accordance with claim 4, in which the zero-setting circuit includes a pulse generator connected to receive the said resultant signal and to generate a pulse for each cycle of the supply frequency with a phase dependent on the said rotor angle; a capacitance and a charging circuit for the capacitance; a discharge circuit for the capacitance controlled by the said pulse generator, so that the charging cycle of the capacitance is synchronized with the operation of the pulse generator; and a comparator for comparing the voltage level at said capacitor with an adjustable reference level and for generating a pulse train having a mark-to-space ratio controlled by the relationship between the two compared signals, whereby zero-setting for the apparatus is effected by adjustment of the said reference level.

6. Apparatus in accordance with claim 5, in which said reference level is derived from a potentiometer the supply voltage for which is derived from the charging circuit for the capacitor, whereby changes in the charging current for the capacitor are prevented from affecting the zero-setting operation.

7. Apparatus in accordance with claim 6, comprising a second capacitance connected to receive the peak voltage of the first capacitance and a circuit responsive to the voltage on the second capacitance and connected for controlling the supply voltage for the said potentiometer.

8. Apparatus for signalling the angular displacement $\phi$ of the rotor of a synchro transmitter or resolver about an axis, comprising:
   means for deriving from the synchro transmitter or resolver first and second electric signals representing respectively $\sin \omega t \sin \phi$ and $\sin \omega t \cos \phi$, where $\omega t$ is the phase angle of the supply for the synchro transmitter or resolver;
   phase-shifting means for deriving from the first signal a third signal representing $\cos \omega t \sin \phi$, the phase-shifting means including an integrator circuit connected to receive the said first signal and a series circuit comprising an inverter and a differentiator circuit also connected to receive the said first signal;
   signal-combining means connected to receive the outputs of the integrator circuit and the said series circuit and the first signal for deriving a fourth signal representing the sine of the sum or difference of the angles $\omega t$ and $\phi$; and means, including a comparator, responsive to the said fourth signal and to a further signal representing a trigonometric function of an angle varying with the angle $\omega t$ to derive an output signal varying with the angle $\phi$ and having a full cycle of variation in a submultiple of a 360° variation of the angle $\phi$.

* * * * *